April 1, 1958    J. G. INGRES    2,828,720
BOOSTER BRAKE MECHANISM
Filed Feb. 15, 1955    3 Sheets-Sheet 2

INVENTOR
JEANNOT G. INGRES
BY John V. Phillips
ATTORNEY

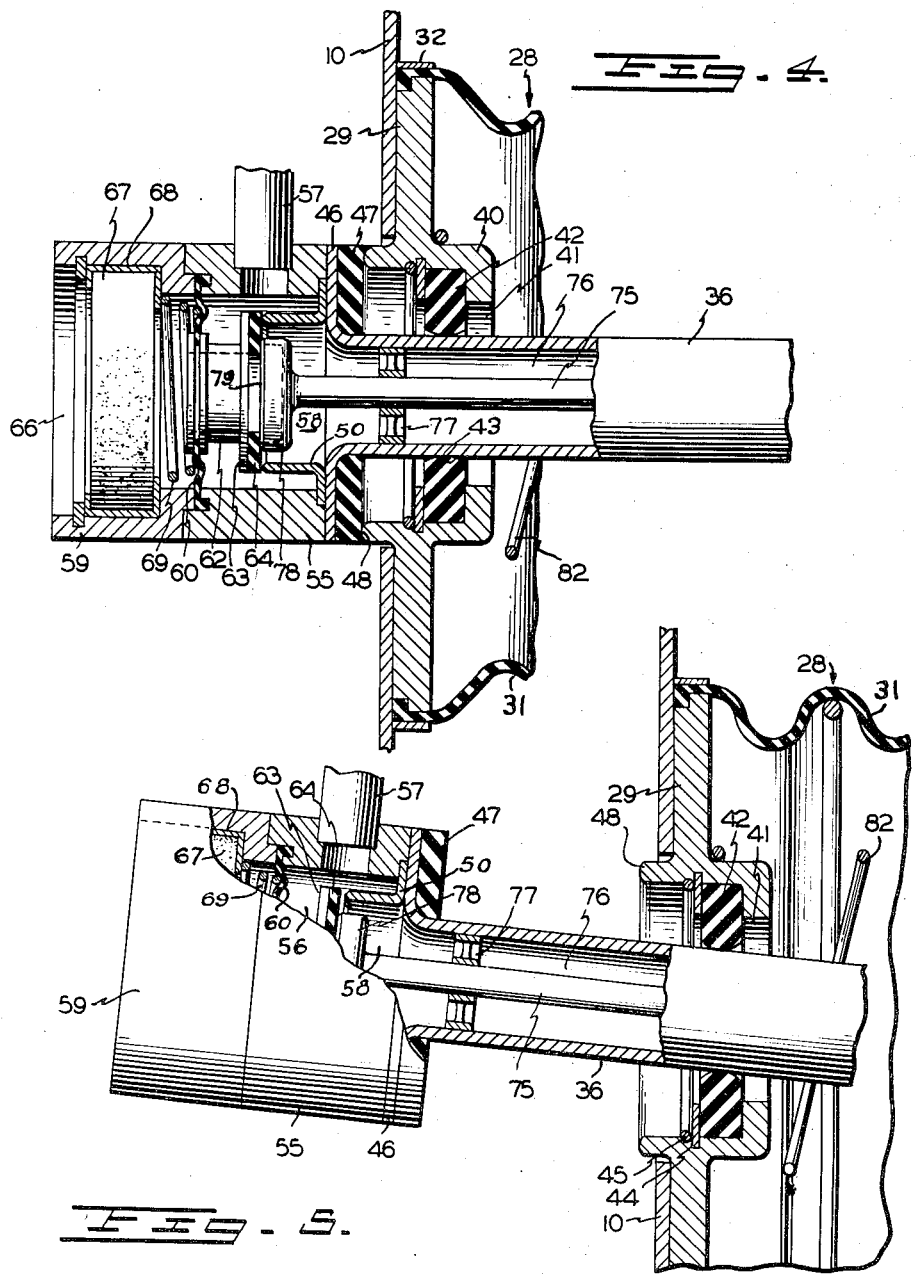

ated lever by pedal pressure, independent

United States Patent Office 2,828,720
Patented Apr. 1, 1958

2,828,720

BOOSTER BRAKE MECHANISM

Jeannot G. Ingres, Dearborn, Mich., assignor to Kelsey-Hayes Company, a corporation of Delaware Application February 15, 1955, Serial No. 488,257

8 Claims. (Cl. 121—41)

This invention relates to a booster brake mechanism, and has particular reference to an improved motor structure for use with so-called "hanging type" brake pedal levers.

In my copending application Serial No. 463,492, filed October 20, 1954, I have shown an improved type of booster brake mechanism for use with hanging brake pedals wherein a novel pedal leverage arrangement is utilized for energizing a booster motor and for assisting the latter in applying the vehicle brakes. In such mechanism, initial operation of the brake pedal operates a valve to energize a motor carried by the fire wall of the motor vehicle, and such initial movement also effects initial movement of the operating rod connected to the plunger of the master cylinder. The latter operation in earlier types of mechanisms of this character caused a "hard" pedal for the reason that the lever ratio for effecting initial operation of the master cylinder plunger is lower than in conventional pedal operated brake systems. In the copending application referred to, however, this initial brake pedal operation takes place with a high lever ratio so that effecting movement of the master cylinder plunger by initial movement of the brake pedal did not make the brake feel too "hard."

The softness of the brake pedal in the structure of the copending application was maintained by the use in the booster motor of a spool or sleeve type valve which is movable without pressure resistances such as are present in valves of the poppet type. However, spool or sleeve valves are open to some objection because of the impossibility of accurately controlling clearances, thus always resulting in some degree of leakage around the valve.

An important object of the present invention is to provide a booster brake mechanism of the character referred to wherein all of the advantages of the soft pedal of the copending application are retained while embodying a follow-up control valve of the poppet type for the motor, and to provide such an arrangement of parts that the poppet valving is substantially pressure balanced under all operating conditions.

A further object is to provide such an apparatus wherein the poppet valve and the parts directly associated therewith are pressure balanced when the booster motor is de-energized but become pressure unbalanced upon energization of the motor, and to provide novel auxiliary means which becomes effective when the motor is energized for neutralizing the pressure unbalancing of the poppet valving, thus causing it to be in effect a pressure balanced valve under all conditions.

A further object is to provide an apparatus of the character referred to wherein the auxiliary pressure balancing means serves the additional function of effectively sealing the motor against the entrance of air thereinto except under the control of the valve mechanism.

A further object is to provide an apparatus of the character referred to wherein the novel motor itself, and which cooperates with the booster brake operating mechanism as a whole provide a highly efficient brake operation, the motor per se being disclosed and claimed in my copending application Serial No. 494,203, filed March 14, 1955, now Patent No. 2,799,252, which application is a division of the present application.

Other objects and advantages of the invention will become apparent during the course of the following description.

In the drawings I have shown one embodiment of the invention. In this showing:

Figure 3 is a detail fragmentary sectional view showing the valve operating rod and associated elements and the connection thereof with the brake pedal and motor operated lever;

Figure 4 is an enlarged fragmentary sectional view through the valve mechanism and associated motor parts, the valve mechanism being shown in lapped position; and Figure 5 is a generally similar view showing the positions of the parts when the motor is energized.

Figure 1:
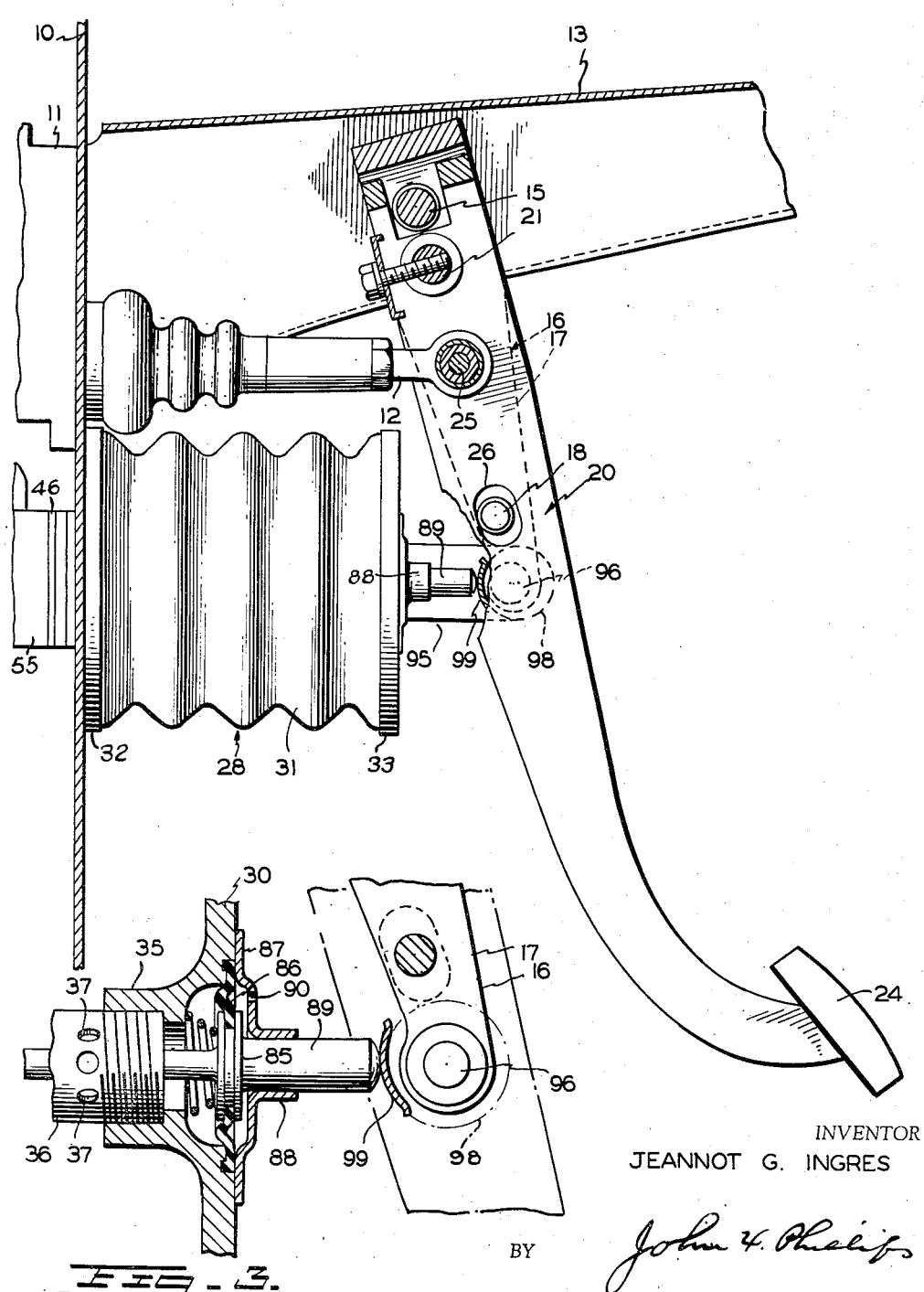
Figure 1 is a side elevation of the apparatus, parts being broken away and parts being shown in section.
Figure 2:
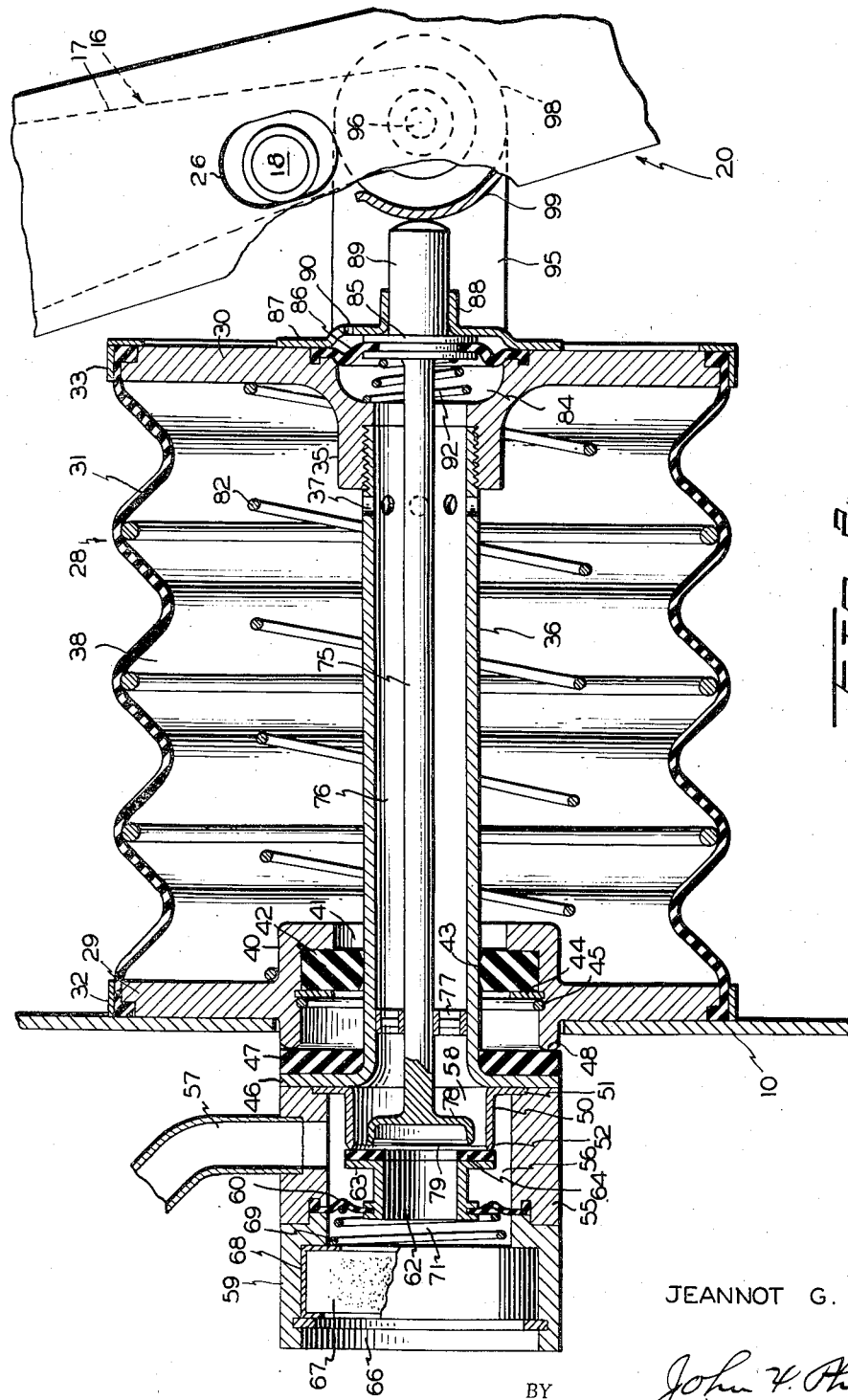
Figure 2 is an enlarged axial sectional view through the motor, parts being shown in elevation and parts being broken away, the valve parts being shown in motor de-energizing positions.

Referring to Figures 1, 2 and 4, the numeral 10 designates the conventional fire wall of a motor vehicle against the forward face of which is mounted a conventional master cylinder 11 having the usual fluid displacing plunger (not shown) operable by a push rod 12. The fire wall 10 supports the forward end of a rearwardly extending bracket 13 of substantially inverted U shape, as shown in the copending application referred to. The particular type of bracket 13 makes no difference so far as the present invention is concerned.

In certain types of motor vehicles, a bracket similar to the bracket 13 is employed for pivotally supporting the upper end of a depending brake pedal connected to the push rod 12. In the present case, the bracket 13 supports a pivot pin 15, and this pin pivotally supports a lever 16 which preferably is of inverted J shape and includes a depending body portion 17. The lever portion 17 carries a transversely extending pin 18 for a purpose to be described.

A pedal lever 20 is pivotally supported with respect to the lever 16 by a pivot pin 21, and it will become apparent that the pedal lever is free to swing independently of the lever 16, within limits, and it will also become apparent that the pivot pin 21, under conditions to be described, moves bodily about the axis of the supporting pin 15.

The pedal lever 20 is provided at its lower end with a pedal pad 24 and is pivotally connected as at 25 to the push rod 12. The pedal lever 20, moreover, is provided with a slot 26 wider than and receiving the pin 18. This pin, when the motor to be described is de-energized, normally engages the left side of the slot 26. This slot is wider than the pin 18 to permit movement of the pedal lever 20, in the initial operation of the device, independently of the lever 16. It will be apparent that initial movement of the pedal lever by pressure on the pedal pad 24 operates the push rod 12. This initial operation of the push rod 12 does not make the pedal "hard" since the lever arms represented by the distance between the pedal pad 24 and pin 21 and the distance between the pin 25 and the pin 21 about equal in ratio that of conventional brake pedals for directly applying the brakes of a vehicle by pedal pressure.

A motor, preferably of the air suspended vacuum type, is employed for delivering power to the lever 16. This motor is shown in Figure 2 and is indicated as a whole by the numeral 28. The motor comprises a stationary wall 29 fixed in any suitable manner to the fire wall 10, a pressure movable wall 30 spaced from the wall 29, and a connecting bellows 31 fixed at its ends to the respective walls 29 and 30 by clamping rings 32 and 33. The wall 30 is provided with an axial boss 35 internally threaded for connection with the rear end of a tubular member 36 apertured as at 37 adjacent the boss 35 to communicate at all times between the interior of the tube 36 and the chamber 38 in the motor, defined by the walls 29 and 30 and bellows 31.

The motor wall 29 is provided with a hub portion 40 having a relatively large opening 41 through which the tube 36 extends. The hub 40 carries a highly resilient sealing ring 42 having a curved central opening 43 through which the tube 36 extends. It will become apparent that the tube 36 is slidable through the seal 42 and changes its angle relative to the axis of the hub 40, as shown in Figure 5. The seal 42 may be retained in position in any suitable manner, for example by a retaining ring 44 maintained in position by a snap ring 45.

The forward end of the tube 36 is provided with an outstanding annular flange 46 to which is connected in any suitable manner a rubber or similar bumper and seal member 47 engageable with the forward extremity 48 of the hub 40. An annular cylindrical valve seat member 50 is provided with an annular flange 51 seating against the flange 46 and maintained in position in a manner to be described. The forward extremity of the member 50 terminates in a valve seat 52.

A cylindrical body 55 is secured in any suitable manner to the flange 46 and retains the flange 51 in position as will be clear in Figures 2, 4 and 5. The body 55 forms a chamber 56 communicating with an elbow or nipple 57 to which is suitably connected a flexible conduit leading to a source of vacuum such as the intake manifold of the vehicle engine. The valve seat member 50 divides the vacuum chamber 56 from a variable pressure chamber 58 within the member 50.

A cylindrical housing 59 is fixed in any suitable manner against the forward end of the body 55 and cooperates therewith to secure in position therebetween the outer periphery of a flexible diaphragm 60. This diaphragm is fixed at its radially inner end to a valve body or thimble 62 having a flange 63 at the end opposite the diaphragm 60. Fixed to the flange 63 is a resilient valve element 64 engageable with the seat 52.

The housing 59 is open-ended as at 66 and contains an air cleaner 67 retained in a sheet metal housing 68. A spring 69 seats at one end against the housing 68 and has its rear end engaging the diaphragm 60. The spring 69 may be very light. Rearwardly of the air cleaner 67, this member and associated elements define a chamber 71 which obviously is always open to the atmosphere and, accordingly, atmospheric pressure is always present within the valve body 62.

A rod 75 is mounted axially in the tube 36 and defines therewith an annular passage 76 extending therethrough. The forward end of the rod 75 is supported by a spider 77 and carries at its rear end a cupped member 78 the forward edge 79 of which forms a valve seat engageable under conditions to be described with valve element 64. Normally, the valve seat 79 is spaced from the valve 64, thus opening the annular passage 76 to the atmosphere through thimble 62, and atmospheric pressure will be maintained in the motor chamber 38 through openings 37. Obviously, the parts are held in normal motor deenergized positions with the valve 79 unseated, by a return spring 82 in the motor 28.

The rod 75 extends into a recess 84 in the rear face of the head 30 and the rod is flanged as at 85 for connection with the inner edge of an annular diaphragm 86. The outer edge of this diaphragm is maintained in sealing engagement with the head 30 by a cap 87. This cap has a cylindrical rearward sleeve extension 88 in which is slidable a button 89 fixed to the flange 85, the flanged portion, button 89 and rod 75 preferably being integral. The rear face of the diaphragm 86 is exposed at all times to atmospheric pressure through a port 90 through the cap 87. A light spring 92 is arranged between the bottom of the recess 84 and the flanged portion 85 to urge the latter into engagement with the cap 87, thus limiting rearward movement of the rod 75 with the valve seat 79 disengaged from the valve element 64.

Offset from the axis thereof, the head 30 is provided with a relatively heavy rearwardly extending boss or arm 95 connected by pivot pin 96 to the lower end of the body 17 of the lever 16. Accordingly, it will be apparent that when the motor is energized to move the head 30 toward the left in Figure 1, the boss 95 will effect similar movement of the pin 96 to turn the lever 16 about the pivot pin 15.

The pedal lever 20 has fixed thereagainst a plate 98 provided with an arcuately shaped lateral extension 99 projecting across the axis of and engaging with the button 99 whereby the latter, together with the rod 75 and valve seat 79 will be moved to the left upon initial depression of the pedal pad 24.

Operation

All of the parts, when the brakes are released, occupy the positions shown in Figure 1. When the brake is to be applied, the operator will depress the pedal pad 24 and initial operation of the brake lever 20 performs two functions. The brake lever is directly connected to the push rod 12 for the plunger of the master cylinder, and accordingly initial brake pedal operation effects some movement of the master cylinder plunger. As disclosed in the copending application referred to above, this does not cause a particularly hard pedal since the ratio of the lever arms represented by the distance between the pivot pin 21 and pedal pad 24 and between the pivot pins 21 and 25 is about equal to the lever ratios employed in a conventional brake pedal without a booster mechanism. The pedal of course, in its initial movement, turns about the axis of the pivot pin 21, the lever 16 momentarily remaining stationary.

The second initial function of the brake pedal is to effect movement of the button 89 (Figure 2) to the left, the lateral extension 99 carried by the brake pedal 20 effecting such movement. This movement of the button 89 moves the rod 75 to the left in Figure 2 to initially engage the valve seat 79 with the valve element 64, and the valves will now occupy a lap position. The annular space 76 within the tube 36, which previously communicated with the atmosphere to maintain atmospheric pressure in the motor chamber 38, as previously stated, will now be cut off from the atmosphere at the valve seat 79.

Slight additional movement of the rod 75 by movement of the brake pedal, causes the engagement between the valve seat 79 and valve element 64 to move the valve element from the seat 52. The annular space 76 will now be connected to the vacuum source through chamber 56 and pipe 57 and air will be exhausted from the motor chamber 38. Atmospheric pressure acting on the right-hand face of the motor head 30, as viewed in Figure 2, will cause this head to move to the left. This movement will be transmitted through arm 95 to pin 96 and thus to the lever arm 17 to swing this member about the axis of the pivot pin 15. This movement of the motor head 30 and lever arm 17 continues so long as movement is imparted to the brake lever 20. When movement of the brake lever is arrested, a slight additional movement of the motor head 30, transmitted through tube 36, will move the valve seat 52 into engagement with the valve element 64, thus cutting off the motor chamber 38 from the source of vacuum. The valve mechanism accordingly provides a perfect follow-up action.

Actually, during initial operation of the master cylinder, all of the forces applied to the master cylinder piston will be delivered by pressure of the foot on the pedal pad 24, transmitted through pin 25 and push rod 12.

This is wholly practicable in view of the lever ratio referred to above, corresponding to conventional brake practice without a booster mechanism.

It will be noted that the lever ratio referred to is not capable of providing the necessary distance of travel of the push rod 12 to displace a sufficient volume of hydraulic fluid into the brake lines for full application of the brakes. This is compensated for by the fact that during motor operation, movement imparted to the lever 16 causes the pivot pin 21 to turn clockwise about the axis of the pivot pin 15. This involves movement to the left in Figure 1 of the pivot pin 21 which adds to the effective travel of the pivot pin 25 and hence of the push rod 12 and the master cylinder plunger. Moreover, power applied to the pivot pin 21 by the lever 16 assists the brake pedal in applying force through the push rod 12 to the master cylinder piston.

Up to a predetermined degree of hydraulic pressure in the brake system, the pin 18 (Figure 1) will be spaced from the left-hand side of the slot 26 due to movement of the pedal lever relative to the lever 16 during the initial operation described above. Assuming that the brake lever is pushed for a substantially full brake application, a point of power "run-out" will be reached, namely, the point at which the motor 28 will be energized to the maximum extent, and this occurs prior to maximum brake application. As the point of power run-out is approached, the pedal lever tends to move ahead of the power lever 16, in which case the right-hand side of the slot 26 (Figure 1) will approach the pin 18 and will come into contact therewith approximately at the point of power run-out. Beyond this point, forces applied to the pedal pad 24 will be delivered through the pedal lever 20 and pin 18 to the power lever 16, and foot pressure will be delivered to the lever 16 to continue turning movement thereof, carrying with it the pivot pin 21. Thus this pin is bodily moved to the left to compensate for the short lever arm between pivot pins 21 and 25 to provide the necessary maximum displacement of fluid from the master cylinder.

Inasmuch as the lever 16 turns bodily about the pivot pin 15, it will be obvious that the axis of the connecting pin 96 between the lug 95 and lever arm 17 swings in an arc of a circle about the axis of the pin 15. During the first portion of brake application, movement of the connecting pin 96 will have a downward component of movement, thus tilting the axis of the head 30, tube 36 and associated elements downwardly toward the right as viewed in Figures 1 and 2, thus causing the tube 36 and associated elements to assume the approximate maximum angular position shown in Figure 5. This tilting movement is permitted by virtue of the resiliency of the seal 42. During this time the motor will be energized and the parts of the valve mechanism will occupy the positions shown in Figure 5. The lap position of the valve parts is shown in Figure 4, this position being reached before motor energization takes place and before any tilting of the tube 36 occurs.

When the brake pedal is released, the spring 92 moves the rod 75 and the elements connected thereto to the right as viewed in Figure 1. This releases the valve seat 79 for movement to motor de-energized position (Figure 1) and the valve element 64 will engage the valve seat 52. The motor chamber 38 will again be connected to the atmosphere and the return spring 82 will move the head 30 to the normal off position shown in Figure 1. Movement to such position is limited by the bumper 47 which engages the hub end 48. The bumper 47 serves to silence return movement of the parts to normal position and also serves to seal the interior of the hub 40 from the atmosphere.

The valve mechanism and associated parts are highly important in the functioning of the apparatus. The valve is of the poppet type, thus providing perfect sealing in any position of the valves. However, the nature of the structure is such that the valve mechanism is perfectly pressure balanced, thus eliminating the necessity for the operator's having to exert force at any time to change the positions of the valves. Thus the device provides a valve mechanism which is as easily operable as a spool or sleeve valve without the disadvantage of fluid leakage around the valve.

Referring to Figure 1 wherein the valve parts are shown in motor de-energizing position, it will be noted that atmospheric pressure is present at the right hand side of the valve element 64 while vacuum is present to the left of the flange 63, thus creating a net pressure tending to move the valve element 64 to the left. This net valve-unseating pressure, however, is balanced by pressures affecting the diaphragm 60. Assuming that there is an imaginary line around the diaphragm 60 intermediate the radial width thereof, all pressures within such line will be transmitted through the diaphragm to the thimble 62. Pressures radially outwardly of such imaginary line will be transmitted through the diaphragm to the relatively stationary elements 55 and 59. Radially inwardly of the imaginary line referred to there will be vacuum present to the right of the diaphragm 60 and air pressure to the left thereof. These pressures create a net force tending to move the thimble 62 and consequently the valve 64 toward the right. The imaginary line referred to is of a radius approximately equal to the radius of the valve seat 52; hence, the net pressures tending to move the thimble 62 and valve 64 to the left are exactly balanced by the net forces tending to move these elements toward the right. It requires virtually no force, therefore, to unseat the valve element 64 from the valve seat 52. When the motor is de-energized as in Figure 1, it will be obvious that atmospheric pressure is present on both sides of the diaphragm 86 carried by the pressure movable head 30. This diaphragm therefore is pressure balanced and has no effect on the rod 75 and valve seat 79. Thus the spring 69 may be extremely light. However, when the valve seat 79 picks up the valve element 64 and moves it out of engagement with the valve seat 52, a substantially greater area of the right-hand face of the valve element 64 will be subjected to vacuum than is true when the motor is de-energized. The net pressure acting toward the right on the diaphragm 60, therefore, would in itself tend to return the valve element 64 into engagement with the valve seat 52, thus requiring the application of appreciable force from the brake pedal to maintain the valve 64 open.

When the motor is energized, however, vacuum is present in the space 76, and accordingly the left-hand face of the diaphragm 82 is exposed to vacuum. The right-hand face of this diaphragm is always exposed to atmospheric pressure through port 90 and, accordingly, there will be a net pressure acting to the left against the diaphragm 86 to overcome the net pressure tending to move the valve element 64 against the seat 52. The net pressures tending to move the diaphragm 86 toward the left will be greater than the net pressures tending to move the thimble 62 toward the right and this difference in pressures is compensated for by the spring 92. The increased pressures tending to seat the valve 64 during motor energization, therefore, are substantially exactly balanced by the net pressure tending to move the diaphragm 86 toward the left, minus the tension of the spring 92.

From the foregoing it will be apparent that the present construction renders wholly practicable the use of poppet valving with its attendant well-known advantages and without the disadvantage of requiring force for moving any of the valve parts under any conditions. The pressure balancing of the parts permits the operator to move the valves with the requirement of only negligible force, thus preserving the highly desirable soft pedal which is important in an apparatus of this character. All of the valve units are carried by the moving parts of the motor and the same is true of the air cleaner 67, thus facilitating assembly and installation. Moreover, the placing of the parts connected to the source of vacuum forwardly of the fire wall 10 effectively eliminates any objection to the sound of air rushing into and out of the motor chamber.

It will be understood that the form of the invention shown and described is to be taken as a preferred example of the same and that such changes in the shape, size and arrangement of parts may be made as do not depart from the scope of the appended claims.

I claim:

1. A power mechanism comprising an operating rod, a pivotally supported power lever, a pivotally supported pedal lever connected to said operating rod and having lost motion connection with said power lever, said pedal lever having a valve operating element, and a fluid pressure motor comprising a stationary head, a movable head spaced therefrom and a bellows connecting said heads, means pivotally connecting said movable head with said power lever, and a valve mechanism for controlling energization of said motor, said valve mechanism comprising a housing having an annular valve seat dividing it to form a pair of chambers one of which communicates with the interior of said motor and the other of which communicates with a source of vacuum, a movable valve seat concentric with said first-named valve seat, a rod connected to said movable valve seat and having an end arranged adjacent said valve operating element to be moved thereby, a valve body having a valve element engageable with said seats, a diaphragm connected between said housing and said valve body and having substantially equal opposite areas affecting said valve body and subject respectively to atmospheric pressure and pressure in said other chamber, means biasing said valve toward said seats, and means biasing said movable valve seat to a normal position away from said valve whereby said one chamber communicates with the atmosphere through said valve body, said valve having opposite effective areas communicating with said chambers to balance pressures at opposite sides of said valve when said movable valve seat is in normal position.

2. A power mechanism comprising an operating rod, a pivotally supported power lever, a pivotally supported pedal lever connected to said operating rod and having lost motion connection with said power lever, said pedal lever having a valve operating element, and a fluid pressure motor having a movable head adjacent said levers and pivoted to said power lever, a stationary head remote from said movable head and a bellows connecting said heads, a tube carried by said movable head and projecting through said stationary head in sealed relationship thereto, said tube communicating with the interior of said motor, and a valve mechanism for said motor comprising a housing carried by said tube externally of said stationary head, a first annular valve seat carried by and dividing said housing to form a vacuum chamber communicating with a source of vacuum and a variable pressure chamber within said valve seat, a valve body and a valve carried thereby movable axially of said motor and normally engaging said valve seat, a diaphrgam connected between said valve body and said housing and forming one end of said vacuum chamber, the side of said diaphragm opposite said vacuum chamber being open to the atmosphere and said valve body having an axial opening therethrough communicating at one end with the atmosphere and with an axial opening through said valve seat, a second annular valve seat within said first-named valve seat engageable with said valve, a stem carried by said second valve seat and projecting through said tube and through said movable head to be engaged by said valve operating element, and means biasing said movable valve seat away from said valve for the normal seating of the latter against said first-named valve seat, the effective areas of said diaphragm exposed to the atmosphere and to said vacuum chamber tending to move said valve body being equal, and the effective areas at opposite sides of said valve exposed to said chambers, when said second valve seat is disengaged from said valve, being equal whereby said valve is pressure-balanced in opposite directions axially of said motor, and light spring means biasing said valve toward said seats.

3. Apparatus according to claim 2 wherein said housing has a portion projecting beyond said diaphragm away from said stationary head, and an air cleaner mounted in and carried by said projecting portion of said housing.

4. Apparatus according to claim 2 wherein said movable head is provided with a second diaphragm fixed at its radially outer edge thereto, the radially inner edge of such diaphragm being fixed to said stem, the inner face of said second diaphragm being open to pressure in the interior of said tube and the outer face of such diaphragm being exposed to atmospheric pressure.

5. A power mechanism comprising an operating rod, a power lever supported for turning movement on a fixed axis, a pedal lever mounted for turning movement on an axis carried by said power lever and spaced from said fixed axis, said levers having lost motion connection with each other, said pedal lever being connected to said operating rod and being provided with a valve operating element, and a fluid pressure motor comprising a stationary head, a movable head spaced therefrom and a bellows connecting said heads, means pivotally connecting said movable head with said power lever, and a valve mechanism for controlling energization of said motor, said valve mechanism comprising a housing having an annular valve seat dividing it to form a pair of chambers one of which communicates with the interior of said motor and the other of which communicates with a source of vacuum, a movable valve seat concentric with said first-named valve seat, a rod connected to said movable valve seat and having an end arranged adjacent said valve operating element to be moved thereby, a valve body having a valve element engageable with said seats, a diaphragm connected between said housing and said valve body and having substantially equal opposite areas affecting said valve body and subject respectively to atmospheric pressure and pressure in said other chamber, means biasing said valve toward said seats, and means biasing said movable valve seat to a normal position away from said valve whereby said one chamber communicates with the atmosphere through said valve body, said valve having opposite effective areas communicating with said chambers to balance pressures at opposite sides of said valve when said movable valve seat is in normal position.

6. A power mechanism comprising an operating rod, a power lever supported for turning movement on a fixed axis, a pedal lever mounted for turning movement on an axis carried by said power lever and spaced from said fixed axis, said levers having lost motion connection with each other, said pedal lever being connected to said operating rod and being provided with a valve operating element, and a fluid pressure motor having a movable head adjacent said levers and pivoted to said power lever, a stationary head remote from said movable head and a bellows connecting said heads, a tube carried by said movable head and projecting through said stationary head in sealed relationship thereto, said tube communicating with the interior of said motor, and a valve mechanism for said motor comprising a housing carried by said tube externally of said stationary head, a first annular valve seat carried by and dividing said housing to form a vacuum chamber communicating with a source of vacuum and a variable pressure chamber within said valve seat, a valve body and a valve carried thereby movable axially of said motor and normally engaging said valve seat, a diaphragm connected between said valve body and said housing and forming one end of said vacuum chamber, the side of said diaphragm opposite said vacuum chamber being open to the atmosphere and said valve body having an axial opening therethrough communicating at one end with the atmosphere and with an axial opening through said valve seat, a second annular valve seat within said first-named valve seat engageable with said valve, a stem carried by said second valve seat and projecting through said tube and through said movable head to be engaged by said valve operating element, and means biasing said movable valve seat away from said valve for the normal seating of the latter against said first-named valve seat, the effective areas of said diaphragm exposed to the atmosphere and to said vacuum chamber tending to move said valve body being equal, and the effective areas at opposite sides of said valve exposed to said chambers, when said second valve seat is disengaged from said valve, being equal whereby said valve is pressure-balanced in opposite directions axially of said motor, and light spring means biasing said valve toward said seats.

7. Apparatus constructed in accordance with claim 6 wherein said housing has a portion projecting beyond said diaphragm away from said stationary head, and an air cleaner mounted in and carried by said projecting portion of said housing.

8. Apparatus according to claim 6 wherein said movable head is provided with a second diaphragm fixed at its radially outer edge thereto, the radially inner edge of such diaphragm being fixed to said stem, the inner face of said second diaphragm being open to pressures in the interior of said tube and the outer face of such diaphragm being exposed to atmospheric pressure.

References Cited in the file of this patent

UNITED STATES PATENTS

| | | |
|---|---|---|
| 2,197,075 | Fitzgerald | Apr. 16, 1940 |
| 2,207,700 | Porter | July 16, 1940 |